Figure 1:
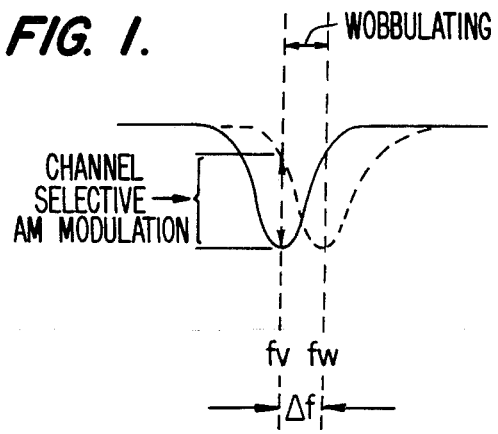

United States Patent [19]

Mistry et al.

[11] Patent Number: 4,575,753
[45] Date of Patent: Mar. 11, 1986

[54] METHOD OF AND APPARATUS FOR SCRAMBLING AND DECODING TELEVISION AND SIMILAR SIGNALS WITH WOBBULATING TRAPPING

[75] Inventors: Kantilal Mistry, Freehold; Isaac S. Blonder, Morganville, both of N.J.

[73] Assignee: Blonder-Tongue Laboratories, Inc., Old Bridge, N.J.

[21] Appl. No.: 546,320

[22] Filed: Oct. 28, 1983

[51] Int. Cl.⁴ .................. H04K 1/02; H04N 7/167
[52] U.S. Cl. ................................. 358/118; 358/114
[58] Field of Search ............. 358/118, 120, 114, 121, 358/122, 123

[56] References Cited

U.S. PATENT DOCUMENTS

| | | | |
|---|---|---|---|
| 3,175,033 | 3/1965 | Blonder et al. | 358/121 |
| 3,813,482 | 5/1974 | Blonder | 178/5.1 |
| 4,095,258 | 6/1978 | Sperber | 358/120 |
| 4,163,252 | 7/1979 | Mistry et al. | 358/118 |
| 4,268,860 | 5/1981 | Blonder | 358/118 |

Primary Examiner—S. C. Buczinski
Assistant Examiner—Melissa Koltak
Attorney, Agent, or Firm—Rines & Rines, Shapiro & Shapiro

[57] ABSTRACT

Television or similar picture scrambling or the like wherein narrow trapping of the visual carrier is effected with one-direction FSK-FM modulated wobbulation of the visual carrier, preferably alternately at different multiples of the horizontal synchronizing frequency.

6 Claims, 2 Drawing Figures

METHOD OF AND APPARATUS FOR SCRAMBLING AND DECODING TELEVISION AND SIMILAR SIGNALS WITH WOBBULATING TRAPPING

The present invention relates to methods of and apparatus for scrambling (or encoding) and unscrambling (or decoding) television and similar transmissions as for subscription or other security reception and the like, being more particularly directed to effecting such results with the aid of frequency-wobbulated traps or filtering.

The uses of switched and wobbulating trapping are described, for example, in prior U.S. Pat. Nos. 3,175,033 and 4,268,860 of Isaac S. Blonder, of common assignee with the present invention, for introducing scrambling or picture distortion into television signals and unscrambling or decoding or restoring the picture at an authorized (subscriber) location. While there are also other successful techniques for signal scrambling and decoding both over the air and in cable and other systems, such as those employing horizontal and/or vertical sync jitter and the like, as described in U.S. Pat. Nos. 3,813,482; 4,095,258 and 4,163,252, also of common assignee herewith, the wobbulating trap, for certain application, is relatively inexpensive and effective.

There are occasions, particularly where the wobbulating is to be employed for scrambling, that minimum interference with adjacent channel transmissions is important and must be insured. This is particularly true if this scrambling is employed, for example, in cable television at subscriber's end.

It is to such and other applications that the improvements underlying the present invention are primarily, though not exclusively, directed; it being an object of the invention to provide a new and improved method of and apparatus for wobbulating trapping and signal restoring for use in scrambled television channel transmission that insures lack of interference with adjacent channel transmissions.

A further object is to provide a novel wobbulating trapping apparatus of more general utility as well.

Other and further objects will be explained hereinafter and are more particularly delineated in the appended claims.

In summary, however, the invention embraces a method of scrambling television channel and similar signals having visual carrier and horizontal synchronizing frequencies, that comprises, trapping the visual carrier frequency with narrow band and shallow attenuation of itself ineffective for satisfactory visual signal scrambling, wobbulating the trapping back and forth on one side only of the carrier frequency, and alternately effecting the wobbulating at different frequencies that are different multiples of the said horizontal synchronizing frequency to effect satisfactory signal scrambling without adjacent channel interference. Preferred and best mode embodiments and details are hereinafter presented.

Figure 2:
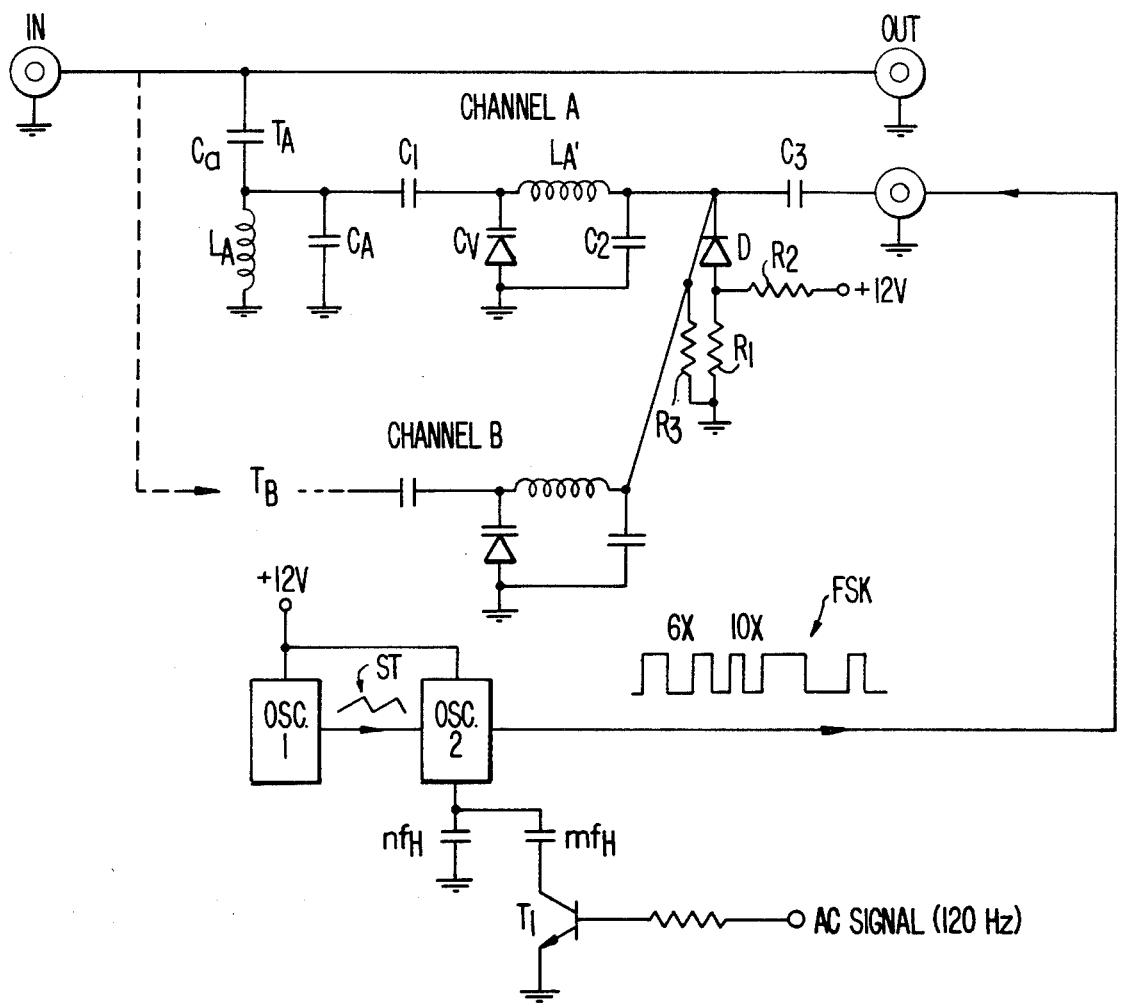

The invention will now be described with reference to the accompanying drawings, FIG. 1 of which is a waveform diagram illustrating the trapping effect of the invention; and FIG. 2 is a circuit diagram of a preferred embodiment employing frequency shift keying (FSK) frequency modulation of trap tuning.

Referring to FIG. 1, in accordance with the technique underlying the present invention, trapping is employed at the visual carrier frequency $f_v$ of a predetermined television channel transmission, but critically rather shallowly attenuating, say of the order of 6 db, of itself inadequate or ineffective attenuation for scrambling. The trapping then is frequency-shift-keyed during frequency modulatation to wobbulate the trap frequency on one side only of the carrier frequency fv, shown in FIG. 1, but with a minimum frequency deviation $\Delta f$ to avoid adjacent channel interference, say of the order of 0.75 MHz. By thus shifting the trap frequency back and forth only above the carrier, and at successively different frequencies that are different multiples of the horizontal synchronizing signal, this technique has been found to effect satisfactory signal scrambling without adjacent channel interference (as is often normally encountered with deep trapping and wobbulation on both sides of the channel carrier frequency).

A suitable preferred circuit for effecting this type of adjacent channel non-interferring scrambling is shown in FIG. 2 as applied to a cable channel scrambler, or other subscription or secure systems. The input "In" from the various VHF television channels is shown applied to separate corresponding channel trapping circuits (labelled Channel A, Channel B, etc.) each having an appropriately tuned trap $T_A$, $T_B$, etc, shown in the example of Channel A as comprising a B series capacitor $C_a$, and a parallel inductance-capacitance network $L_A - C_A$ series-connected by capacitor $C_1$ to a series coil $L'_A$. The left-hand terminal of $L'_A$ is connected through a voltage-variable impedance, shown as capacitor $C_v$ ("varicap") to ground, and the right-hand terminal through a parallel capacitor $C_2$ to ground. As before stated, the trap is tuned to the appropriate channel carrier frequency $f_v$ and is critically adjusted for rather shallow or narrow trapping (of the order of about 6 db), avoiding prior-art deep trapping for the reasons above noted.

The wobbulating or frequency scanning of the trap frequency is effected by applying an appropriate FSK-FM modulation of trap position which gives rise to amplitude modulation of the visual carrier. In accordance with the best mode or preferred embodiment, an assymetrical saw-tooth or sweep oscillator OSC.1 is employed, set at a mid-audio frequency, say of 1000 Hz (or a much lower frequency and up to several thousand Hz—say 4000 Hz—may be suitable), to frequency modulate a second oscillator OSC.2 that is to generate the FSK-FM signals, so-labelled. The second oscillator OSC.2 is frequency shift keyed at multiples of the horizontal line synchronizing or scan frequency $f_H$, preferably alternately between two different multiples $mf_H$ and $nf_H$. The output train signal OSC.2 is applied through coupling capacitor $C_3$ to effect FSK-frequency modulation of the trap frequency by variation of the value of variable capacitor $C_v$, normally set at a value for tuning the trap to the channel carrier $f_v$. By use of a clamping circuit comprising diode D and bias resistors $R_1$, $R_2$, and $R_3$, the modulating voltage applied by OSC.2 to the trap variable capacitor $C_v$ is clamped to insure frequency change in one direction only from the carrier $f_v$, shown to the right (or above) in FIG. 1 between $f_v$ and $f_w$, with a rather limited frequency swing $\Delta f$ of the order of, say, +0.75 MHz.

To effect adequate picture scrambling, the keying of OSC.2 is, as before stated, alternately switched between $mf_H$ and $nf_H$—say, for example, between $10f_H$ and $6f_H$—at the power line rate or multiples of power line rate or up to $f_H$, shown at "AC Signal" as 120 Hz. The $6f_H$ and $10f_H$ modulation effects are shown in waveform FSK, appropriately labelled 6x and 10x, respectively; namely, 157.34 KHz and 94.5 KHz, representing ten and six times the horizontal line frequency, respectively). By thus scrambling the sync and video at the rate of oscillator OSC.2, dynamic scrambling of a varying pattern in the picture is provided, with the alternate switching of OSC.2 between 6x and 10x enhancing the scrambling.

As before indicated, with this type of operation, the frequency deviation and the trap depth are kept to a minimum such as not to generate interference with an adjacent channel, but the frequency deviation is sufficient to AM-modulate the visual carrier of the channel-to-be-scrambled to a degree entirely adequate for picture distortion or scramble.

Further modifications will occur to those skilled in this art and such are considered to fall within the spirit and scope of the invention as defined in the appended claims.

What is claimed is:

1. A method of scrambling television channel and similar signals having visual carrier and horizontal synchronizing frequencies, that comprises, trapping the visual carrier frequency with narrow band and shallow attenuation of itself ineffective for satisfactory visual signal scrambling, wobbulating the trapping back and forth on one side only of the carrier frequency, and alternately effecting the wobbulating at different frequencies that are different multiples of the said horizontal synchronizing frequency to effect satisfactory signal scrambling without adjacent channel interference.

2. Apparatus for the scrambling of television channel and similar signals including carrier and horizontal synchronizing frequencies, the apparatus having, in combination, trapping means comprising voltage-controlled variable impedance means for narrowly and shallowly trapping the visual carrier frequency of a predetermined channel, means for generating FSK signals switched between first and second frequencies that are different multiples of the television horizontal synchronizing frequency, means for frequency modulating said generating means, and means for applying the output of said generating means to said trapping means to control said variable impedance means thereof in order to frequency-shift-key frequency modulate the trap frequency so as to wobbulate the trap frequency on one side only of the carrier frequency.

3. Apparatus as claimed in claim 2 and in which means is provided for switching the FSK generating means at power line frequency or a small multiple thereof, and said frequency modulating means comprises a saw-tooth oscillator adjusted to operate at a frequency up to about 4000 Hz.

4. Apparatus as claimed in claim 2 and in which the deviation of frequency modulation is of the order of 0.75 KHz.

5. Apparatus as claimed in claim 2 and in which said different multiples of horizontal synchronization frequency are about six and ten.

6. A method of scrambling television channel and similar signals having visual carrier and horizontal synchronizing frequencies, that comprises, trapping the visual carrier frequency with narrow band and shallow attenuation of itself ineffective for satisfactory visual signal scrambling, wobbulating the trapping back and forth on one side only of the carrier frequency, and alternately effecting the wobbulating at a frequency that is a multiple of the said horizontal synchronizing frequency to effect satisfactory signal scrambling without adjacent channel interference.

* * * * *